(12) United States Patent
Coffey et al.

(10) Patent No.: US 8,479,515 B2
(45) Date of Patent: Jul. 9, 2013

(54) SOLAR POWER GENERATOR

(76) Inventors: Joseph Bertrand Coffey, Aztec, NM (US); Joseph Bertrand Peter Coffey, Appleton, ME (US); Sean Peter Edgcomb Coffey, Boston, MA (US)

( * ) Notice: Subject to any disclaimer, the term of this patent is extended or adjusted under 35 U.S.C. 154(b) by 525 days.

(21) Appl. No.: 11/615,528

(22) Filed: Dec. 22, 2006

(65) Prior Publication Data
US 2007/0151245 A1   Jul. 5, 2007

Related U.S. Application Data

(60) Provisional application No. 60/754,348, filed on Dec. 28, 2005.

(51) Int. Cl.
*F03G 6/00* (2006.01)
(52) U.S. Cl.
USPC .................................. 60/641.11; 60/641.15
(58) Field of Classification Search
USPC .......................................... 60/641.8–641.15
See application file for complete search history.

(56) References Cited

U.S. PATENT DOCUMENTS

| | | | | |
|---|---|---|---|---|
| 4,081,966 A | * | 4/1978 | deGeus | 60/641.15 |
| 4,205,657 A | * | 6/1980 | Kelly | 126/603 |
| 4,249,386 A | * | 2/1981 | Smith et al. | 60/693 |
| 4,397,152 A | * | 8/1983 | Smith | 60/641.15 |
| 4,438,630 A | * | 3/1984 | Rowe | 60/676 |
| 5,347,986 A | * | 9/1994 | Cordy | 126/574 |

* cited by examiner

*Primary Examiner* — Hoang M Nguyen

(57) ABSTRACT

Solar energy is converted into electricity by use of a solar concentrator system, a steam production system, a turbine and an alternator. A boiler is heated by a concentrator dish aimed at the sun. The dish may also be fitted with a polar mount, an actuator and a devise for sensing the relative position of the sun. There is a mast on the dish upon which a boiler is mounted which is heated by the sun's concentrated rays. The boiler will preferably be arranged to heat and vaporize water to create continuous steam that is delivered to turn the turbine which is operatively connected to the alternator and from which electricity is generated.

17 Claims, 3 Drawing Sheets

SOLAR POWER GENERATOR

CROSS NOTING

This application claims priority to US Provisional Application Ser. No. 60/754,348, filed on Dec. 28, 2005, titled Sun mill, by Joseph Bertrand Coffey, Joseph Bertrand Peter Coffey, and Sean Peter Edgcomb Coffey, which is incorporated herein by reference.

TECHNICAL FIELD

The present invention relates generally to generation of electrical power through solar energy, and is more particularly related to apparatus, systems and method for the conversion of solar energy into electrical power which can be used for residential consumption, net metering and sale on an electric grid system.

BACKGROUND

Solar energy systems are typically expensive, requiring costly photovoltaic cells. It would be an advance in the art to provide a solar energy generator using commonly available parts.

SUMMARY

In one implementation, there is provided a low cost method for converting solar energy into electrical power for home consumption, net metering and sale on the grid.

In another implementation, a method is provided for converting solar energy into electrical power for home consumption, net metering and sale on the grid consisting of a solar concentrator system, a steam production system, a turbine and an alternator. In this method, a boiler is heated by a concentrator dish aimed at the sun having parabolic shaped support ribs attached to adjacent polished metallic (e.g.; aluminum) reflector petals. The dish is also fitted with a polar mount, an actuator and a devise for sensing the relative position of the sun. There is a mast on the dish upon which a metallic (e.g.; aluminum or stainless steel) boiler is mounted and is heated by the sun's concentrated rays. The boiler will preferably be arranged to heat and vaporize water.

The system employed by the method includes a water refill chamber, independent of the boiler, and a pump controlled by a float switch, which senses the boiler water level and is designed to transfer water from the refill chamber through a pre-heater in the turbine case to the boiler. A float valve, connected to a pressurized water supply line maintains the refill chamber at a pre-determined level. In the boiler, a pre-determined amount of water is kept constant; thereby maintaining the steam amount unaltered and making the steam available always immediate, of constant temperature and pressure and continuous.

In one implementation, the steam is supplied to a central inlet passage being the hollow shaft of a radial outward flow turbine having aerodynamically designed rotor arms, which supply steam for propulsion by discharging it at right angles to the shaft through holes or nozzles near the ends of the rotor arms. In another implementation, the steam can be supplied to a known drag turbine or Tesla turbine. The turbine can drive a variable speed alternator, where the turbine can be of varied sizes, and the alternator can be of varied wattages (e.g.; about 3 kilowatts). The alternator can be wired to the standard types of controllers, rectifiers, inverters and voltage regulators as are employed in known state-of-the-art windmill alternators, standard alternators and photovoltaic installations. Power produced can be alternating current, direct current, or both. The system can be stand-alone or grid connected.

In one implementation, the inventive system uses a steam condenser, such as the combination of a commonly available automotive radiator and electric fan. Moreover, drain-back provisions that can be made for use in cold climates are included. A super heater can be attached to the boiler to further heat the saturated steam so as to improve the efficiency of the entire system. There can be further provided a condenser with drain-back provisions for use in cold climates, a super heater, and a control system to compensate for variations in incidental solar energy, thereby increasing the efficiency of the entire system. The control system will preferably operate by dividing the flow of water entering the boiler into a main flow, passing through pre-heating, evaporation and superheating stages, and a secondary water flow. A first part of the secondary water flow can be injected directly into the evaporation stage and a second part of the secondary water flow can be injected directly into the superheating stage. The control system will also preferably include valves for varying the rate of flow of the main water flow, and the first and second parts of the secondary water flow such as to maintain constant the temperature of the output, superheated steam through a system of instant feedback.

In yet another implementation, there is provided a system that includes a concentrator dish aimed at the sun and having parabolic shaped support ribs attached to adjacent polished metallic (e.g.; aluminum) reflector petals. The dish is also fitted with a polar mount, an actuator and a devise for sensing the relative position of the sun. There is a mast on the dish upon which a metallic (e.g.; aluminum or stainless steel) boiler with a pressure relief valve is mounted. The side of the boiler facing the dish and intercepting the focus area or "hot spot" of the parabola is blackened. The other sides (e.g.; five sides) of the boiler are preferably insulated. In an alternative embodiment, a metal plate (e.g.; 14 gauge steel plate) intercepts the hotspot. The boiler is located on the side of the plate facing the sun and receives heat through a steel rod welded to that side of the plate.

Heated by the sun's concentrated rays, the boiler is arranged to heat and vaporize water. The system includes a water refill chamber independent of the boiler and a pump controlled by a float switch, which senses the boiler water level and is designed to transfer water from the refill chamber through a pre-heater in the turbine case to the boiler. A float valve, connected to a pressurized water supply line, maintains the refill chamber at a pre-determined level. In the boiler, a predetermined amount of water is kept constant; thereby maintaining the steam amount unaltered and making the steam use always immediate.

The steam is supplied to the hollow shaft of a radial outward flow turbine having aerodynamically designed rotor arms, which supply steam for propulsion by discharging it at right angles to the shaft through holes or nozzles near the ends of the rotor arms. The turbine drives a variable speed alternator. In an alternate embodiment, steam is supplied to a drag or Tesla turbine which drives a variable speed alternator.

The turbine can be of varied sizes and the alternator can be of varied wattages. The alternator in this embodiment is 3 kilowatts. The alternator can be wired to the standard types of controllers, rectifiers and inverters as are employed in known state-of-the-art windmill alternator and photovoltaic installations. Power produced can be alternating current, direct current, or both. The system can be stand-alone or grid connected.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DESCRIPTION

The present invention will now be described more fully hereinafter with reference to the accompanying drawings, in which some, but not all embodiments of the invention are shown. Indeed, this invention may be embodied in many different forms and should not be construed as limited to the embodiments as set forth herein; rather, these embodiments are provided so that this disclosure will satisfy applicable legal requirements.

One implementation includes a solar concentrator system, a steam production system, a turbine and an alternator with its electrical accessories.

Solar Concentrator

Figure 1:
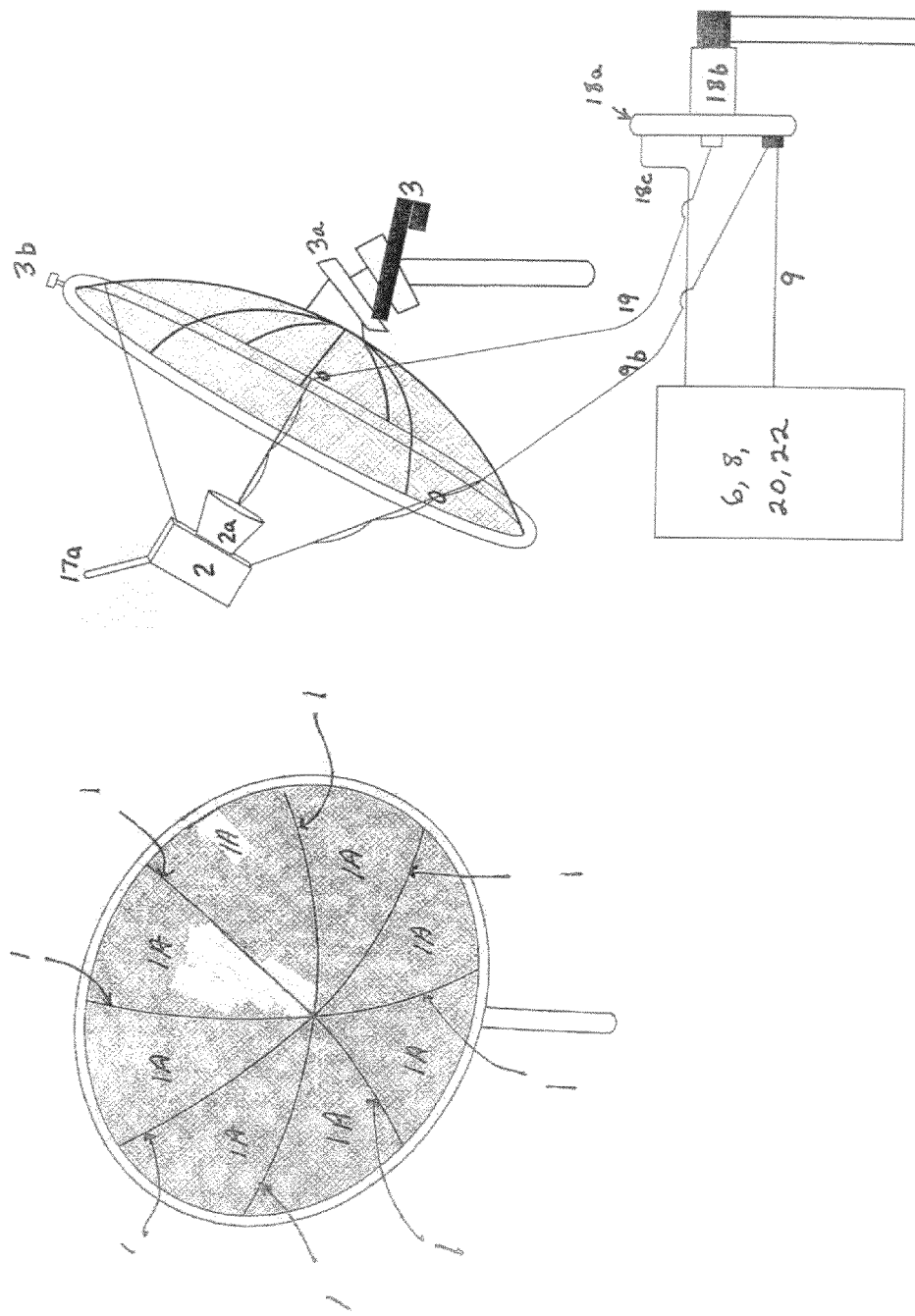
FIG. 1 shows an implementation of a concentrator dish standing on a pipe and articulated by an actuator to follow the sun's arc.

In FIG. 1, a concentrator dish 1, about ten-foot in diameter, stands on a pipe, perpendicular to the earth, and is aimed at the sun. Dish 1 has parabolic shaped support ribs 1 firmly attached to adjacent aluminum reflector petals 1a polished to a mirror finish. The backs of the petals are insulated.

Figure 2:
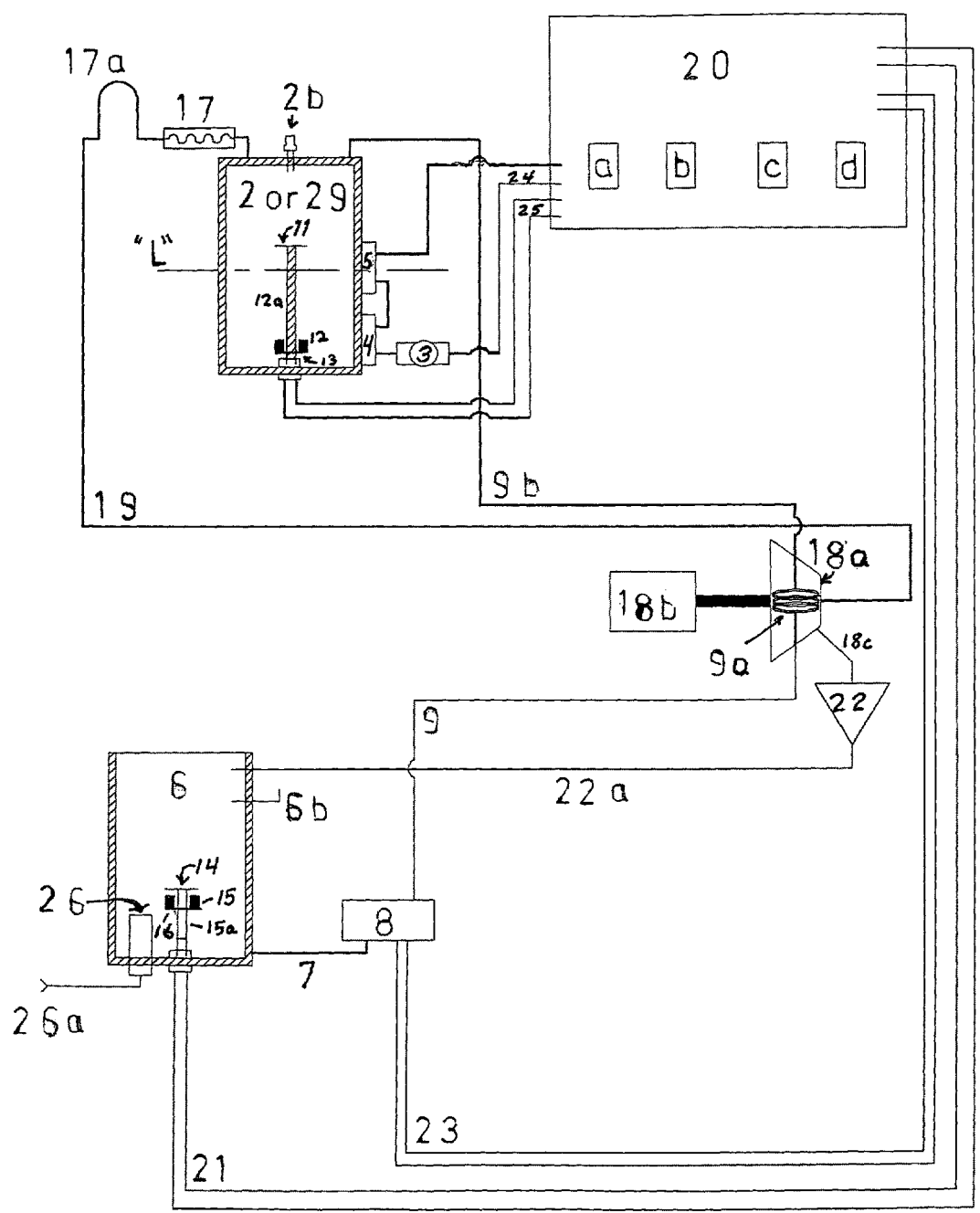
FIG. 2 shows an implementation featuring a steam producing system having a boiler heated by the sun's concentrated rays, or in the alternative by a heating rod which has been heated by the sun's concentrated rays on a collector plate.
Figure 3:
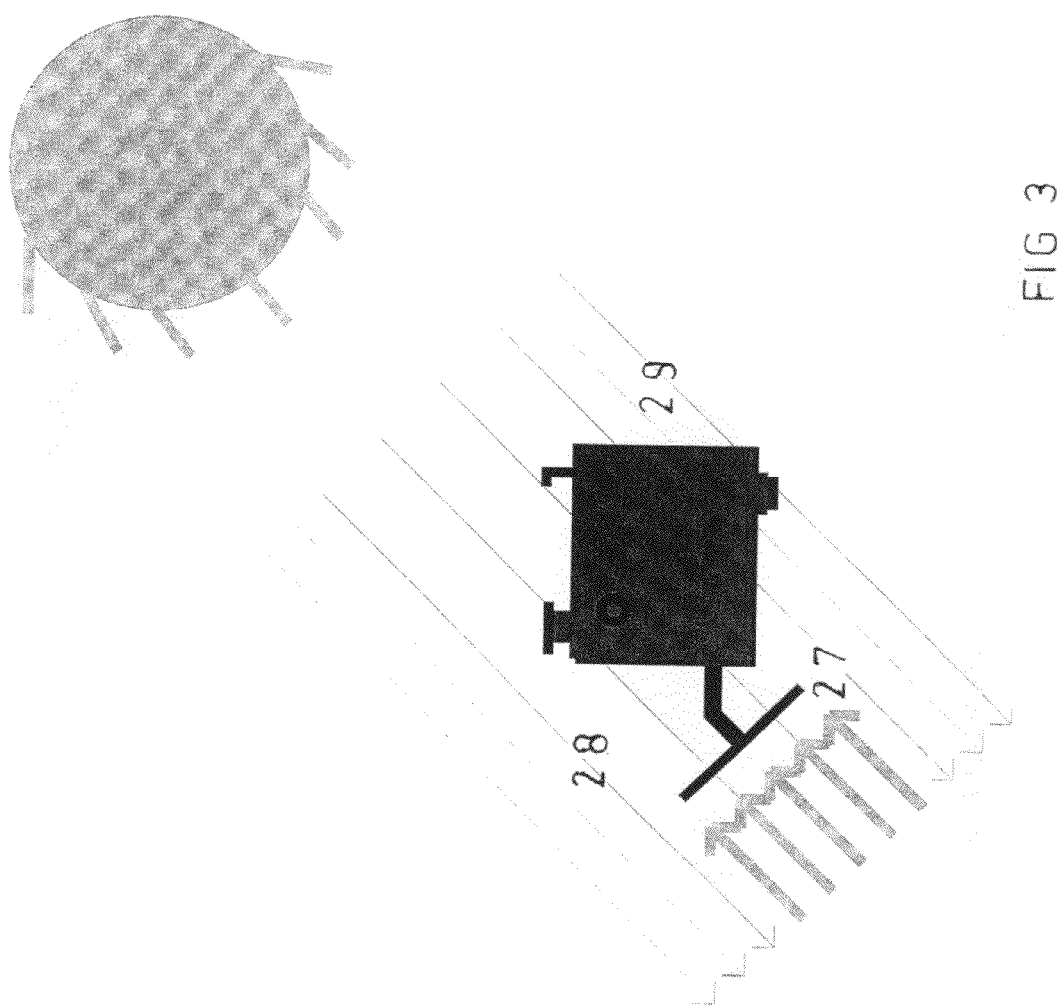
FIG. 3 shows an implementation featuring a plate that intercepts radiation from the concentrator dish, where a boiler is located on a side of the plate facing the sun so as to receive heat through a rod on the side of the plate.

Referring now to FIGS. 1-3, there are shown reflective petals 1A each separated by parabolic shaped ribs 1. Also shown are a boiler 2, a windshield 2a, a pressure relief valve 2b, a milk stool mast 2c, a polar mount 3a, a sun sensor 3b, a pressure switch 4, a thermostat 5, a refill chamber 6, a hose 7 between refill chamber 6 and a pump 8. A hose 9 is seen between pump 8 and a pre-heater 9a (located in a turbine case). There is an insulated hose 9b between pre-heater 9a and boiler 2. A first float switch 11, a first micro-contact 12, and first tube 12a are shown, as are a float 13 that is movable along first tube 12a, A second float switch 14 and a second micro-contact 15 are shown, as are a second tube 15a and a second float 16 moveable along second tube 15a.

A super heater 17 is shown as are a steam loop 17a, a turbine 18a, an alternator 18b, a hose 18c carrying exhaust steam from turbine 18a to a condenser 22, an insulated steam hose 19 between steam loop 17a and turbine 18a, an electrical control board (ECB) 20, an electrical connection 21 between second float switch 14 and ECB 20, a hose 22a carrying condensate to a refill chamber, an electrical connection 23 between pump 8 and ECB 20, an electrical connection 24 between screw jack actuator 3, thermostat 5 and pressure switch 4 and ECB 20, an electrical connection 25 for first float switch 11 and ECB 20, a float valve 26, a water feed 26a from a pressurized source, a steel collector plate 27, an adjustable angled heating rod 28, and an alternate boiler 29. Note that "L" seen in FIG. 2 is the predetermined level of water in boiler 2 or alternate boiler 29, or "L" is a water/steam division line.

Dish 1 can be fitted with a polar mount 3a, which allows alignment to the changing ark of the sun and a screw jack actuator 3 set up to track the sun along the aligned ark. Alternatively, a horizon-to-horizon type of actuator can be used in place of the screw jack. There is also a known device for sensing the relative position of the sun. As the earth turns throughout the day, the sun sensor 3b energizes the motor on the actuator 3, momentarily moving the dish to align with the sun's new relative position. Except for the reflective petals 1a and the sun sensor 3b and parts of the below described Steam Production System, the dish and fittings are of a type commonly manufactured for home C-band satellite reception.

There is either a buttonhook or milk stool mast on the dish upon which an aluminum or stainless steel boiler 2 with a pressure relief valve 2b, a thermostat 5, a pressure switch 4 and a float switch 11 are mounted. In the embodiment described herein, a milk stool mast 2c and a stainless steel boiler 2 of an approximate two-liter capacity are used.

The side of the boiler 2 facing the dish and intercepting the focus area or "hot spot" of the parabola is blackened with engine paint. The other five sides of the boiler are insulated with refractory ceramic fiber spun from alumina and silica.

The smaller circumference of a stainless steel, cone shaped shield 2a is attached to and encircles the boiler 2 face while its larger circumference opens to the dish. This shield protects the boiler face from heat loss due to wind action. Its interior is blackened and its exterior is insulated.

In an alternative embodiment, a 14 gauge steel plate 27 intercepts the hotspot. The boiler 29 is located on the side of the plate facing the sun and receives heat through a steel rod 28 welded to that side of the plate. The side of the plate facing the dish is blackened and the boiler and the sunny side of the collector plate are insulated and shrouded from the weather as necessary, as shown in FIG. 3.

An insulated water supply hose 9b runs from the boiler 2 down one leg of the mast, piercing the dish and connecting with the pre-heater 9a in the turbine case. An insulated tube carries saturated steam from the exit at the top of the boiler 2 to the inlet of the insulated steam loop 17a located above the boiler 2.

In an alternative implementation, the saturated steam is first let through a super heater 17 located on the face of the boiler 2, or collector plate 27, before connecting with the inlet to the steam loop 17a. The current embodiment omits the super heater 17. Steam is then carried from the outlet of the steam loop 17a through an insulated hose 19 that runs down one leg of the mast, piercing the dish and connecting with the hollow shaft of the turbine 18a.

Steam Producer

In FIG. 2, the steam producing system consists of a boiler 2, heated by the sun's concentrated rays, or in an alternative embodiment, by the heating rod 28 which has been heated by the sun's concentrated rays on a collector plate 27. The Boiler 2 or 29 is designed to heat and vaporize water and is also equipped with a pressure switch 4 and a thermostat 5.

The boiler 2 or 29 is connected to a refill chamber 6 for cold water. A water hose, 7 connects the refill chamber 6 with the pump 8 for the automatic charging of water into the pre-heater 9a and the boiler 2 or 29. Hose 9 connects pump 8 and the pre-heater 9a. Insulated hose 9b connects the pre-heater 9a to boiler 2 or 29. Within the refill chamber 6 there is a float valve 26, similar to that found in any toilet tank, which is connected to a pressurized water supply 26a and maintains the water in the refill chamber at a pre-determined level.

Inside Boiler 2 or 29 a first float switch 11 provided with a first micro-contact 12 housed in a first tube 12a and a first float 13 moveable along the first tube 12a. The first float 13 is designed to close the first micro-contact 12 when the first float 13 is in a lower position and open it when the first float 13 is in an upper position relative to the average loading level corresponding to the water-steam separation line, identified by L in FIG. 2.

Within the refill chamber 6 there is a second float switch 14 for the cold water level control in the refill chamber comprising a second float 15 guided along a second tube 15a and a second micro-contact 16 housed in the second tube 15a. When the second float 15 is in a high position, that is when there is the presence of water, the second micro-contact 16 is open, whereas when the second float 15 is in a low position, that is when there isn't enough water, the second micro-contact 16 is closed. This second float switch 14, is a safety device designed to signal when a pre-determined minimum water level is reached in the refill chamber 6 and to also carry out the stoppage of pump 8 when this minimum water level is reached.

In the embodiment shown, the boiler 2 is connected to the super heater 17 which is connected to the steam loop 17a which is connected by an insulated hose 19 to the hollow shaft of the turbine 18a which is connected to the alternator 18B.

Exhaust steam from the turbine is connected through hose 18c to the top of a condenser 22. The condenser 22 drains condensate, through hose 22a into refill chamber 6, for re-use. Refill chamber 6 is open to the atmosphere through vent 6b to prevent backpressure.

The steam producer utilizes an electric control board 20 of a known type coordinating and connecting all the system components. When the second float switch 14 sends a signal to the control board 20, through connection 21, the control board 20 sends a signal to pump 8 through connection 23. The control board 20 is also connected to the dish actuator 3 through a connection 24, in series with the thermostat 5 and the pressure switch 4. The control board 20 is also connected to the first float switch 11, through a connection 25.

The optional super heater 17 is made from stainless steel tubing that is welded across the face of the boiler in a ribbon candy pattern. It is also blackened with engine paint and its inlet is attached to the boiler's outlet at the top of boiler 2. The super heater's outlet leads to the turbine 18a by way of the steam loop 17a. The steam loop 17a is connected between the boiler 2, through the insulated hose 19, to the turbine 18a; if a super heater 17 is used, then the steam loop 17a is connected between the super heater 17 through the insulated hose 19 to the turbine 18a.

Turbine

The turbine 18a is of the type described as radial outward flow. In this embodiment it has a hollow shaft which supplies steam to aerodynamically designed rotor arms of fiberglass or metal. These, in turn, supply steam for propulsion by discharging it at right angles to the shaft through holes near the ends of the rotor arms. Other embodiments may use nozzles instead of holes. The rotor arms herein consist of tubes of varying lengths covered with an aerodynamically designed housing assembled around a hollow shaft. Other embodiments find the tubes and shaft of varying sizes or enveloped in an aerodynamically designed disk or saucer. The hollow shaft is attached to steam hose 19. In this embodiment, the rotor arms of the turbine are bolted to the alternator's rotating housing 18b. In other embodiments the turbine shaft is coupled to the rotor shaft of an alternator. The turbine 18a is encased, for safety and to collect the exhaust steam, in a cover maintained at atmospheric pressure. The pre-heater 9a for the boiler water consisting of a copper or stainless steel coil is enclosed in this case. The case is connected to the condenser 22 by a hose 18c. In another embodiment, steam is supplied to a known drag turbine or Tesla turbine which drives an alternator.

Alternator

The alternator in this embodiment is three phase, of variable speed and 3 kilowatts made for use with windmills. In other embodiments, the wattage can vary. The alternator can be wired to the standard types of controllers, rectifiers and inverters as are employed in known state-of-the-art windmill alternator and photovoltaic installations. Still other embodiments employ single phase conventional alternators with standard alternating current voltage regulators. Power produced can be alternating current, direct current, or both. The system can be stand-alone or grid connected.

Solar Variation Compensator

In another implementation there is included a control system to compensate for variations in incidental solar energy. The flow of water entering the boiler is divided into a main flow, passing through pre-heating, evaporation and superheating stages, and a secondary water flow. A first part of the secondary water flow is injected directly into the evaporation stage and a second part of the secondary water flow is injected directly into the superheating stage. The control system includes valves for varying the rate of flow of the main water flow, and the first and second parts of the secondary water flow such as to maintain constant the temperature of the output, superheated steam through a system of instant feedback.

Operation

Solar Concentrator

FIG. 1. Sunrise finds the concentrator dish pointing westerly at yesterday's sunset. As sunlight strikes the sun sensor 3b, the dish awakens and is moved by its actuator 3, easterly, along the sun's arc to which the dish has been previously aligned through its polar mount 3a, until it is pointing directly at the sun. Sunbeams reflect from the parabolic petals' 1a mirror finish and are focused on the boiler 2 or collector plate 27, which begins heating its water content. As the earth rotates toward the east, the sun sensor 3b energizes the motor on the actuator 3, momentarily moving the dish westerly to align with the sun's new relative position. Tracked by the dish along its arc, the sun's relative position rises higher into the sky until its heat causes the water in the boiler 2 or 29 to begin evaporating and producing steam.

Steam Producer

Referring to FIG. 2, water enters the refill chamber 6 through the float valve 26 until the predetermined capacity is reached and the float valve 26 shuts off. A switch 20a located on the control board 20 is brought to its "on" position. Automatically, the pump 8 begins sending water through hose 9 and the pre-heater 9a and the insulated hose 9b to the boiler 2 or 29 taking the water from the refill chamber 6 until the water in the boiler 2 or 29 reaches the predetermined level "L" controlled by the first float switch 11. The float switch 11 stops the pump 8 operation at the moment that the water reaches level "L". This water level corresponds to about 50% of the capacity of the boiler, leaving the remaining 50% of the boiler capacity available for future steam use.

At this point, heat from the sun begins heating the water until steam is produced. An indicator lamp 20b on the control board 20 comes on indicating that steam is available for use by the turbine 18a. As the turbine 18a begins running, its exhaust heats the water passing through the pre-heater 9a on its way to the boiler 2 or 29, further increasing the efficiency of the operation. The optional super heater 17 is made from stainless steel tubing that is welded across the face of the boiler 2 or collector plate 27 in a ribbon candy pattern. It is also blackened with engine paint and its inlet is attached to the top of the boiler. The super heater's outlet leads to the turbine 18a by way of the steam loop 17a. A super heater is employed to add energy to the steam. This allows the steam to lose some of its heat energy as it is being conducted to the turbine and still have a temperature above what it takes to start converting steam back to water. The hotter steam can also undergo pressure drops without turning back into water. By imparting more energy to the steam, superheating makes the steam more efficient at producing work.

The steam loop 17a is connected between the boiler 2 or 29 outlet through the insulated hose 19 to the turbine 18a or if a super heater 17 is used, between the super heater 17 through hose 19 to the turbine 18a. This simple ceramic fiber insulated, inverted U-shaped loop of pipe performs several functions. When a super heater 17 is used, the steam loop 17a traps any condensate that accumulates in the super heater 17. The steam loop 17a keeps water in the super heater 17 helping prevent super heater melt down. It forces the water to be transformed into steam before leaving the super heater 17. Also, the steam loop 17a breaks up slugs of water that may exit the boiler and are not flashed to steam by the super heater 17. What water escapes past the super heater 17 or the boiler 2 or 29 is resisted from further movement by the vertical leg of the steam loop 17a.

The condenser 22 can be made from any automotive radiator and electric radiator fan. Steam is admitted to the top of the condenser 22 through a hose 18c. The steam is routed from the turbine 18a case after it has been partially cooled by passing over the pre-heater coil 9a for the boiler 2. As the fan cools the condenser 22, additional heat is removed from the steam and additional condensing of the steam back into water occurs. An opening at the bottom of the condenser is connected to the water refill chamber 6 by hose 22a so that the condensate can drip into the refill chamber to become part of the steam making process again. To maintain the efficiency of the turbine, it is important to keep the turbine 18a case, the condenser 22 and associated piping as unrestricted as possible to avoid back pressurization. The condensate being piped to the refill chamber and the refill chamber having an ample vent 6b to the atmosphere insures that the steam exhaust system does not become pressurized.

As time goes by and steam is used, the water contained in the boiler 2 or 29 tends to decrease and its level goes below the water-steam separation line "L". As a result, the first float switch 11 closes, through its float 13, the first micro-contact 12 causing the operation of the pump 8 which begins sending water to the boiler 2, thereby restoring the water level. The intervention of the pump 8 takes place each time the water level goes below the predetermined level corresponding to a slight difference with respect to the starting level of the water in boiler 2 or 29. By operating in this manner only small amounts of water are admitted each time so that the inner equilibrium conditions of the boiler are not altered and steam is always available to the turbine 18a for use.

As the water contained in the refill chamber 6 is used and decreases to a predetermined level, it triggers the float valve 26, which opens and replenishes the refill chamber from the water feed 26a. If for some reason, water is not available through the water feed 26a the water level in the refill chamber will reach a minimum level causing the second float switch to send a signal to control board 20. The control board 20 indicates by warning light 20c and/or an acoustic warning 20d located on the control board itself that water must be added to the refill chamber 6 in order to restore the starting level. This happens because the second float 16 of the float switch 14 closes the second micro-contact 15 once it has reached its minimum level position. As a result of the closure of the second micro-contact 15, a signal to the pump is sent from control board 20, blocking the operation of the pump so that it won't be damaged from running dry. Once the refill chamber 6 has been replenished, the second float 16 reaches its maximum level position and opens the second micro-contact 15 again, thereby restoring the system to use.

Boiler 2 or 29 is also equipped with an additional safety system consisting of a pressure switch 4 to keep the pressure control and a thermostat 5 to keep the temperature control. When either of these two safety devices 4 or 5 reaches a certain predetermined level, they over-ride the sun-sensor on the concentrator dish and energize the dish actuator 3 which de-focuses the heat on the boiler 2 or 29 by moving the dish away from the sun, thus preventing damage to the boiler from overheating or over pressurization.

This system enables a continuous steam delivery to the turbine at constant pressure and temperature values. It provides safeguards to the system, which avoid damage to its parts in the event of imperfect operation.

It will be recognized that by keeping the water level constant in the boiler and not taking up the whole boiler capacity at each filling any excess of water is avoided, which water would be ejected, making the system temporarily unusable. A further safeguard to ejection is the steam loop, should the boiler somehow become overfilled due to a malfunction.

Turbine

Steam hose 19 delivers steam ranging between 65 and 100 pounds per square inch to a steam tight swivel fitting on the hollow shaft of the turbine 18a. The shaft conducts the steam to the rotor arms where it is discharged at right angles to the shaft through holes near the ends of the rotor arms. The reaction of the steam on the arms propels the turbine at speeds of 700 to 1000 rotations per minute (rpm). Torque developed at the shaft is a function of the length of the arms and the pressure of the steam.

The rotor arms turn the alternator 18b and are bolted to its housing. In other embodiments the turbine shaft is coupled to the rotor shaft of an alternator. The turbine 18a is encased, for safety and to collect the exhaust steam, in a case maintained at atmospheric pressure. The pre-heater 9a for the boiler water consisting of a stainless steel or copper coil is enclosed in this case. The case is connected to the condenser 22 by a hose 18c. In other embodiments, a known drag turbine or Tesla turbine is supplied with steam and drives an alternator.

Alternator

The alternator in this implementation is of three phase variable speed, producing 3 kilowatts of alternating current and made for use with windmills. The rotor arms of the turbine are bolted to the alternator's housing which holds the permanent magnets. This housing rotates around the alternator shaft and coils. The shaft and coils remain stationary and are attached to a fixed support. The turbine can spin the alternator at speeds of up to 1000 rpm. At 750 rpm the alternator will produce approximately 3 kilowatts of unregulated alternating current. It can be wired to the standard types of controllers, rectifiers and inverters as are employed in known state-of-the-art windmill alternator and photovoltaic installations. Still other embodiments employ single phase conventional alternators with standard alternating current voltage regulators. Power produced can be alternating current, direct current, or both. The system can be stand-alone or grid connected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mobile/residential solar energy generator comprising a solar concentrator dish of less than ten feet in diameter, a steam turbine, an alternator capable of producing less than ten kilowatts of power, and a boiler, wherein: the solar concentrator dish less than ten feet in diameter: has adjacent polished aluminum reflector petals; is fitted with a true polar mount; includes means for sensing the relative position of the sun in communication with an actuator to move the dish to track the sun in order to continuously concentrate the sun's rays at a focal point; a boiler placed at the focal point allowing liquid in the boiler to be heated by the concentrated sun's rays; the boiler communicates the gaseous liquid to turn the turbine; and the turbine turns the alternator capable of producing less than ten kilowatts of power to generate electricity for mobile/residential use.

2. The solar energy generator as defined in claim 1, wherein: the boiler is heated by the dish when aimed at the sun; the dish has parabolic shaped support ribs attached to the adjacent reflector petals which include polished aluminum; the dish has mounted thereon a mast upon which the boiler is mounted; and the boiler is composed of aluminum or stainless steel.

3. The solar energy generator as defined in claim 2, wherein the boiler is arranged to heat and vaporize water.

4. The solar energy generator as defined in claim 3, further comprising a water refill chamber, independent of the boiler, and a pump controlled by a float switch, which senses the boiler water level and is designed to transfer water from the refill chamber through a pre-heater in the turbine case to the boiler.

5. The solar energy generator as defined in claim 3, further comprising a float valve, connected to a pressurized water supply line, to maintain the refill chamber at a pre-determined level.

6. The solar energy generator as defined in claim 5, wherein a predetermined amount of water is kept constant; thereby maintaining the steam amount unaltered and making steam available always immediate, of constant temperature and pressure and continuous.

7. The solar energy generator as defined in claim 6, wherein steam is supplied to a central inlet passage being the hollow shaft of a radial outward flow turbine having aerodynamically designed rotor arms, which supply steam for propulsion by discharging it at right angles to the shaft through holes or nozzles near the ends of the rotor arms.

8. The solar energy generator as defined in claim 3, wherein the steam is supplied to a known drag turbine or Tesla turbine.

9. The solar energy generator as defined in claim 8, wherein the turbine drives the alternator.

10. The solar energy generator as defined in claim 8, wherein the alternator is a variable speed alternator which can be of varied sizes and can be of varied wattages.

11. The solar energy generator as defined in claim 8, wherein the alternator can be wired to the standard types of controllers, rectifiers, inverters and voltage regulators as are employed in windmill alternators, standard alternators and photovoltaic installations, whereby power can be produced in alternating current, direct current, or both.

12. The solar energy generator as defined in claim 3, further comprising a steam condenser utilizing an automotive radiator and electric fan.

13. The solar energy generator as defined in claim 1, further comprising drain-back provisions for use in cold climates.

14. The solar energy generator as defined in claim 3, further comprising a super heater attached to the boiler to further heat the saturated steam which is included to improve the efficiency of the entire system.

15. The solar energy generator as defined in claim 13, further comprising a control system to compensate for variations in incidental solar energy may be included to increase the efficiency of the entire system and which operates by dividing the flow of water entering the boiler into a main flow, passing through pre-heating, evaporation and superheating stages, and a secondary water flow, wherein a part of the secondary water flow is injected directly into the evaporation stage.

16. The solar energy generator as defined in claim 14, wherein: a part of the secondary water flow is injected directly into the superheating stage; the control system includes valves for varying the rate of flow of the main water flow; and the first and second parts of the secondary water flow in order to maintain constant the temperature of the output superheated steam, through a system of instant feedback.

17. The solar energy generator as defined in claim 3, further comprising a steam loop to force all liquid to be transformed into steam before leaving the boiler or super heater.

\* \* \* \* \*